(12) United States Patent
He et al.

(10) Patent No.: US 12,489,395 B2
(45) Date of Patent: Dec. 2, 2025

(54) STORAGE BAG AND COMBINED SOLAR DEVICE

(71) Applicant: SHENZHEN HELLO TECH ENERGY CO., LTD, Guangdong (CN)

(72) Inventors: Jiajin He, Shenzhen (CN); Wei Bai, Shenzhen (CN); Huajun Yu, Shenzhen (CN); Yiju Yan, Shenzhen (CN)

(73) Assignee: SHENZHEN HELLO TECH ENERGY CO., LTD, Guangdong (CN)

( * ) Notice: Subject to any disclaimer, the term of this patent is extended or adjusted under 35 U.S.C. 154(b) by 0 days.

(21) Appl. No.: 18/175,178

(22) Filed: Feb. 27, 2023

(65) Prior Publication Data
US 2024/0030862 A1    Jan. 25, 2024

(30) Foreign Application Priority Data

Jun. 16, 2022  (CN) .......................... 202221535711.5
Jul. 19, 2022  (CN) .......................... 202210849510.0

(51) Int. Cl.
*H02S 20/30*    (2014.01)
*A45C 3/00*     (2006.01)
*H02S 30/20*    (2014.01)
*H02S 40/22*    (2014.01)

(52) U.S. Cl.
CPC .............. *H02S 30/20* (2014.12); *A45C 3/001* (2013.01); *H02S 20/30* (2014.12); *H02S 40/22* (2014.12)

(58) Field of Classification Search
CPC ....... H01L 31/00–078; Y02E 10/50–60; H02S 20/00–32
See application file for complete search history.

(56) References Cited

U.S. PATENT DOCUMENTS

| 4,513,734 A * | 4/1985 | Butler ...................... F24S 23/77 136/246 |
| 9,653,632 B1 | 5/2017 | Beitman, Sr. |
| 10,024,579 B1 * | 7/2018 | Govar ..................... F24S 25/10 |

(Continued)

FOREIGN PATENT DOCUMENTS

| CN | 101460788 A | 6/2009 |
| CN | 203969563 U | 12/2014 |

(Continued)

OTHER PUBLICATIONS

KR-20160015796-A English (Year: 2016).*

(Continued)

*Primary Examiner* — Bach T Dinh

(57) ABSTRACT

Provided are a storage bag and a combined solar device, relating to the technical field of solar devices. The storage bag is used for storing a bifacial solar panel and includes a first bag body and a second bag body. A first reflective layer is disposed on an inner side of the first bag body. The second bag body is connected to the first bag body. A second reflective layer is disposed on an inner side of the second bag body. In the storage bag, the first reflective layer and the second reflective layer are disposed on the inner side of the first bag body and the inner side of the second bag body respectively, improving the power generation efficiency of the bifacial solar panel and saving the need for a user to carry a separate reflective member, thereby improving the user experience.

4 Claims, 5 Drawing Sheets

(56) References Cited

U.S. PATENT DOCUMENTS

| | | |
|---|---|---|
| 2008/0144203 A1 | 6/2008 | Williams |
| 2010/0118422 A1 | 5/2010 | Holacka |
| 2015/0091494 A1 | 4/2015 | Halpern et al. |
| 2021/0214056 A1 | 7/2021 | Harrison et al. |

FOREIGN PATENT DOCUMENTS

| | | | |
|---|---|---|---|
| CN | 206180942 U | | 5/2017 |
| CN | 107306113 A | | 10/2017 |
| CN | 207706106 U | | 8/2018 |
| CN | 112336031 A | | 2/2021 |
| CN | 215222116 U | | 12/2021 |
| CN | 216290305 U | | 4/2022 |
| CN | 216531153 U | | 5/2022 |
| CN | 114614763 A | | 6/2022 |
| JP | 09064395 A | | 3/1997 |
| JP | H11307791 A | | 11/1999 |
| JP | 2009534856 A | | 9/2009 |
| JP | 2010028027 A | | 2/2010 |
| JP | 5457886 B2 | | 4/2014 |
| JP | 3231525 U | | 4/2021 |
| JP | 3240000 U | | 11/2022 |
| KR | 1020150062374 A | | 6/2015 |
| KR | 20160015796 A | * | 2/2016 |
| KR | 1020160015796 A | | 2/2016 |
| RU | 193323 U1 | * | 10/2019 |

OTHER PUBLICATIONS

RU-193323-U1 English (Year: 2019).*
First Office Action, mailed Jan. 9, 2023, Chinese Patent Application No. 202210849510.0.
Extended European Search Report from corresponding European Application No. EP23155453.6, dated Dec. 6, 2023.
First Office Action dated Jan. 30, 2024 received in corresponding patent family application No. JP2023-021368. English translation attached.
Second Office Action dated Mar. 10, 2023 received in corresponding patent family application No. CN202210849510.0. English translation attached.
The Rejection Decision from corresponding Chinese Application No. CN202210849510.0, dated May 6, 2023. English translation attached.
Grant Notice dated Apr. 9, 2024 received in Chinese Application No. 202210849510.0. English translation attached.
First Office Action dated May 24, 2024 received in corresponding patent family application No. JP2023-021368. English translation attached.
Grant Notice dated Jul. 30, 2024 received in Japanese Patent Application No. JP2023-021368. English translation attached.

* cited by examiner

STORAGE BAG AND COMBINED SOLAR DEVICE

CROSS-REFERENCE TO RELATED APPLICATION(S)

This application claims priority to Chinese Patent Application No. 202210849510.0 filed Jul. 19, 2022, the disclosure of which is incorporated herein by reference in its entirety.

TECHNICAL FIELD

The present disclosure relates to the technical field of solar devices and, in particular, to a storage bag and a combined solar device.

BACKGROUND

Since both the light-receiving surface and the backlight surface of a bifacial solar cell can generate power, the general power generation efficiency of the bifacial solar cell is higher than that of a monofacial solar cell. Therefore, bifacial solar cells are used for more and more solar panels. Since the back of a bifacial solar panel has a low light flux, a separate reflective member generally needs to be provided to improve the power generation efficiency of the back of the bifacial solar panel. In a portable use scenario such as an outdoor activity, a user needs to store and carry the separate reflective member, bringing about inconvenience to the user.

Therefore, there is an urgent need for a storage bag and a combined solar device to solve the preceding problem.

SUMMARY

A storage bag is provided. The storage bag is used for storing a bifacial solar panel. The storage bag includes a first bag body and a second bag body.

A first reflective layer is disposed on an inner side of the first bag body.

The second bag body is connected to the first bag body, where a second reflective layer is disposed on an inner side of the second bag body.

In a solution of the storage bag, the first bag body is movably connected to the second bag body, the second bag body is laid flat, and the storage bag also includes a position maintaining assembly for maintaining the included angle between the first bag body and the second bag body.

In a solution of the storage bag, the position maintaining assembly includes a first end and a second end that are opposite to each other, where the first end is connected to the first bag body and the second end is connected to one of the second bag body, the bifacial solar panel, or the ground.

In a solution of the storage bag, the distance between the second end and the first end is adjustable.

In a solution of the storage bag, the position maintaining assembly is configured to be a flexible structure and also includes a body, where the first end and the second end are disposed at two opposite ends of the body, the second end is connectable to the body so that the second end and the body form an annular structure, the annular structure is configured to be sleeved on the bifacial solar panel, and the position where the second end is connected to the body is adjustable.

In a solution of the storage bag, the position maintaining assembly also includes a first portion and a second portion that are telescopically connected to each other, where the first end is formed at the first portion and away from the second portion, the second end is formed at the second portion and away from the first portion, and the second portion is slidable in a length direction of the first portion to adjust the distance between the second end and the first end.

In a solution of the storage bag, the position maintaining assembly also includes a limiting strap, where two ends of the limiting strap are configured to be the first end and the second end respectively, the first end is rotatably connected to the first bag body, the second end is connected to the second bag body or the bifacial solar panel, or the position maintaining assembly also includes a fastening nail, where the fastening nail is secured to the ground and the second end is connected to the fastening nail.

In a solution of the storage bag, the position maintaining assembly includes a fixing lug and a support rod, where the fixing lug is disposed on a side of the first bag body, an upper end of the support rod is inserted into the fixing lug, and a lower end of the support rod is pressed against the ground.

In a solution of the storage bag, the position maintaining assembly includes a support member disposed on a surface of the first bag body facing away from the second bag body, where one end of the support member is connected to the first bag body and another end of the support member is pressed against the ground.

In a second aspect, a combined solar device is provided. The combined solar device includes a bifacial solar panel and the preceding storage bag, where the bifacial solar panel includes a panel assembly and a support, an upper end of the support is connected to an upper side of the panel assembly, and a lower end of the support abuts against the second bag body.

DETAILED DESCRIPTION

To make solved problems, provided solutions, and achieved effects of the present disclosure clearer, the solutions in the embodiments of the present disclosure are described in detail below in conjunction with the drawings. Apparently, the embodiments described below are part, not all, of the embodiments of the present disclosure. Based on the embodiments of the present disclosure, all other embodiments obtained by those skilled in the art are within the scope of the present disclosure on the premise that no creative work is done.

Embodiment One

Figure 1:
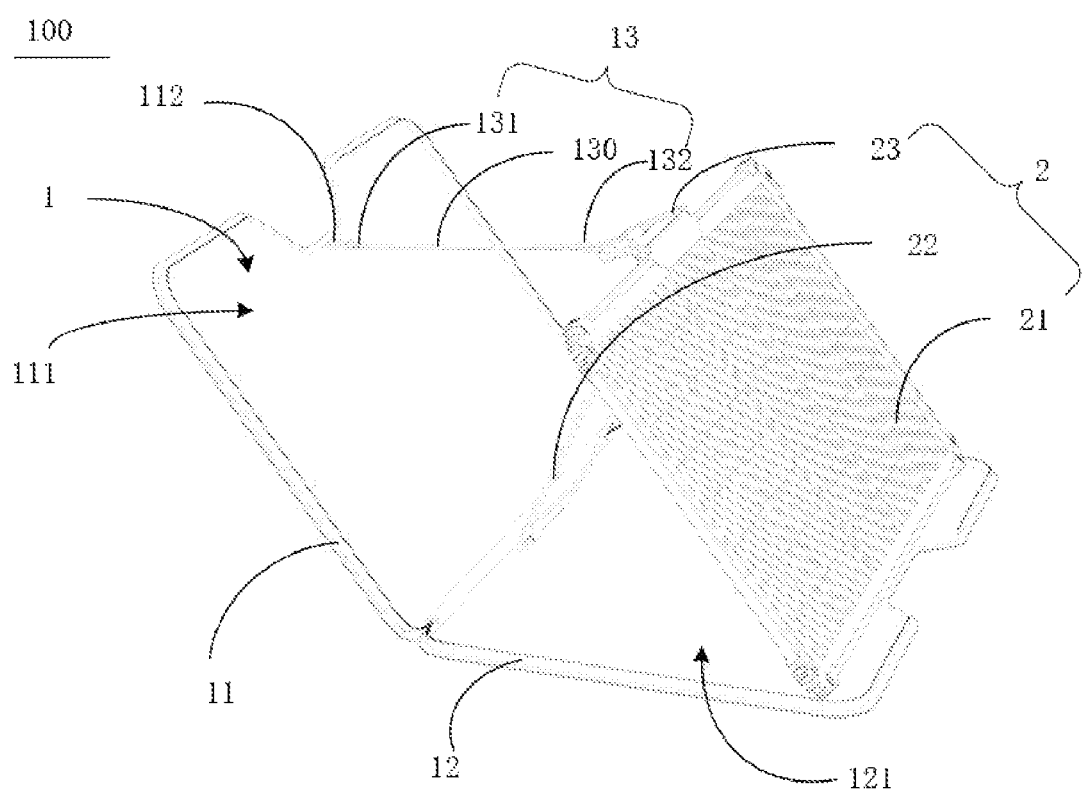
FIG. 1 is a structural view of a combined solar device according to embodiment one of the present disclosure.

As shown in FIG. 1, this embodiment provides a combined solar device 100 including a storage bag 1 and a bifacial solar panel 2. When the bifacial solar panel 2 is not used, the storage bag 1 is closed and the bifacial solar panel 2 is stored in the storage bag 1; and when the bifacial solar panel 2 is used, the storage bag 1 is used for reflecting sunlight to the back of the bifacial solar panel 2 so as to improve the power generation efficiency of the bifacial solar panel 2.

As shown in FIG. 1, the storage bag 1 includes a first bag body 11 and a second bag body 12, where the first bag body 11 and the second bag body 12 are made of cloth, one side of the first bag body 11 is connected to the second bag body 12, the upper side of the first bag body 11 is provided with an annular hook 112, and the other side of the first bag body 11 is connected to the second bag body 12 through a zipper. A first reflective layer 111 is integrally disposed on the inner side of the first bag body 11, and a second reflective layer 121 is integrally disposed on the inner side of the second bag body 12. The first reflective layer 111 and the second reflective g layer 121 are made of a reflective material such as tin foil, aluminum foil, and an aluminized polyethylene terephthalate (PET) film. Multiple trenches are disposed in an array on the first reflective layer 111 and the second reflective layer 121, thereby improving the capability of the first reflective layer 111 and the second reflective layer 121 to perform diffuse reflection.

In an embodiment, in the storage bag 1 provided by this embodiment, the first reflective layer 111 and the second reflective layer 121 are disposed on the inner side of the first bag body 11 and the inner side of the second bag body 12 respectively so that after the storage bag 1 is unfolded, a reflective structure is provided for the bifacial solar panel 2 obliquely supported on the storage bag 1, and the first reflective layer and the second reflective layer reflect the sunlight to the back of the bifacial solar panel 2 facing downward, improving the power generation efficiency of the bifacial solar panel 2 and saving the need for the user to carry the separate reflective member, thereby improving the user experience.

In an embodiment, the second bag body 12 is laid flat, the first bag body 11 is movably connected to the second bag body 12, and in an embodiment, the first bag body 11 is rotatably connected to the second bag body 12 so that an included angle of the first bag body 11 relative to the second bag body 12 is adjustable. The storage bag 1 also includes a position maintaining assembly for maintaining the included angle between the first bag body 11 and the second bag body 12.

In an embodiment, the position maintaining assembly includes a first end 131 and a second end 132 that are opposite to each other, where the first end 131 is connected to the first bag body 11 and the second end 132 is connected to the bifacial solar panel 2.

In an embodiment, the distance between the second end 132 and the first end 131 is adjustable.

In an embodiment, the position maintaining assembly is configured to be a flexible structure and also includes a body 130, where the first end 131 and the second end 132 are disposed at two opposite ends of the body 130, the second end 132 is connectable to the body 130 so that the second end 132 and the body 130 form an annular structure, the annular structure can be sleeved on the bifacial solar panel 2, and the position where the second end 132 is connected to the body 130 is adjustable. In this embodiment, the position maintaining assembly includes a limiting strap 133, where two ends of the limiting strap 133 are configured to be the first end 131 and the second end 132 respectively, the first end 131 is rotatably connected to the first bag body 11, and the second end 132 is connected to the bifacial solar panel 2. A male snap is disposed on the first end 131, a female snap is disposed on the body 130, a hook-and-loop fastener is disposed on one side of the second end 132, a hook-and-loop fastener is disposed on one side of the body 130, the hook-and-loop fastener on the body 130 is extended to a certain length, and there is a certain distance between the hook-and-loop fastener and the female snap.

The bifacial solar panel 2 includes a panel assembly 21, a support 22, and a handle 23. A bifacial solar cell is disposed in the panel assembly 21. The handle 23 is disposed on the upper side of the panel assembly 21. A grip area is disposed on the handle 23. The support 22 is disposed on the backlight surface of the panel assembly 21. The upper end of the support 22 is rotatably connected to the upper end of the panel assembly 21. The lower end of the support 22 is a free end. The support 22 is a hollow structure to ensure more light reflected onto the back of the panel assembly 21.

When not used, the bifacial solar panel 2 is stored in the storage bag 1. When the bifacial solar panel 2 is used, the second bag body 12 is laid flat on the ground, the bifacial solar panel 2 is disposed on the second bag body 12 in a removable manner, the lower side of the bifacial solar panel 2 and the lower side of the support 22 are disposed on the second bag body 12, and the support 22 is opened at an angle such that the light-receiving surface of the bifacial solar panel 2 faces the sunlight. The first end 131 of the limiting strap 133 penetrates through the hook 112 of the first bag body 11 and mates with the female snap on the body 130 of the limiting strap 133 through the male snap of the first end 131 such that one end of the limiting strap 133 is connected to the first bag body 11. The second end 132 of the limiting strap 133 penetrates through the handle 23 of the bifacial solar panel 2 and mates with the hook-and-loop fastener on the body 130 through the hook-and-loop fastener on the second end 132 such that the second end 132 is connected to the bifacial solar panel 2. Thus, the first bag body 11 and the second bag body 12 are at a certain angle, and ideally, the first bag body 11 is parallel to the panel assembly 21.

Since the hook-and-loop fastener on the body 130 has a certain length on the body 130, the position of the hook-and-loop fastener on the second end 132 and the position of the hook- and-loop fastener on the body 130 are adjusted so that the distance between the second end 132 of the position maintaining assembly and the first end 131 of the position maintaining assembly is adjusted. Thus, the angle between the first bag body 11 and the second bag body 12 is adjusted such that the first bag body 11 is parallel to the panel assembly 21.

It is to be understood that in order that the distance between the second end 132 and the first end 131 is adjustable, in some other embodiments, a male snap may also be disposed on the second end 132, multiple female snaps are spaced apart on a side of the body 130 adjacent to the second end 132, and the position where the male snap on the second end 132 is adapted to the female snaps on the body 130 is adjusted so that the distance between the second end 132 of the limiting strap 133 and the first end 131 of the limiting strap 133 is adjustable.

It is to be understood that in some other embodiments, the position maintaining assembly includes a first portion and a second portion that are connected to each other, where the first end 131 is formed at the first portion and away from the second portion, the second end 132 is formed at the second portion and away from the first portion, and the second portion is slidable in a length direction of the first portion to adjust the distance between the second end 132 and the first end 131.

The combined solar device 100 provided by the present disclosure has the beneficial effects described below.

1. The reflective layers are disposed on the inner sides of the storage bag 1 so that the power generation efficiency of the bifacial solar panel 2 is improved and the user does not need to carry the separate reflective member, thereby improving the user experience.

2. The position maintaining assembly maintains the first bag body 11 at a preset angle relative to the second bag body 12 such that the first bag body 11 is parallel to the panel assembly 21 of the bifacial solar panel 2, thereby improving the power generation efficiency of the back of the bifacial solar panel 2.

3. The position maintaining assembly is flexible so that when the bifacial solar panel is not used, the limiting strap 133 is windable/foldable to save space.

4. The distance between the second end 132 of the position maintaining assembly and the first end 131 of the position maintaining assembly is adjustable so that the angle between the first bag body 11 and the second bag body 12 is adjustable. Thus, the first bag body 11 is adjustable as the angle of the panel assembly 21 of the bifacial solar panel 2 is adjusted, thereby improving the efficiency of the bifacial solar panel 2.

Embodiment Two

Figure 2:
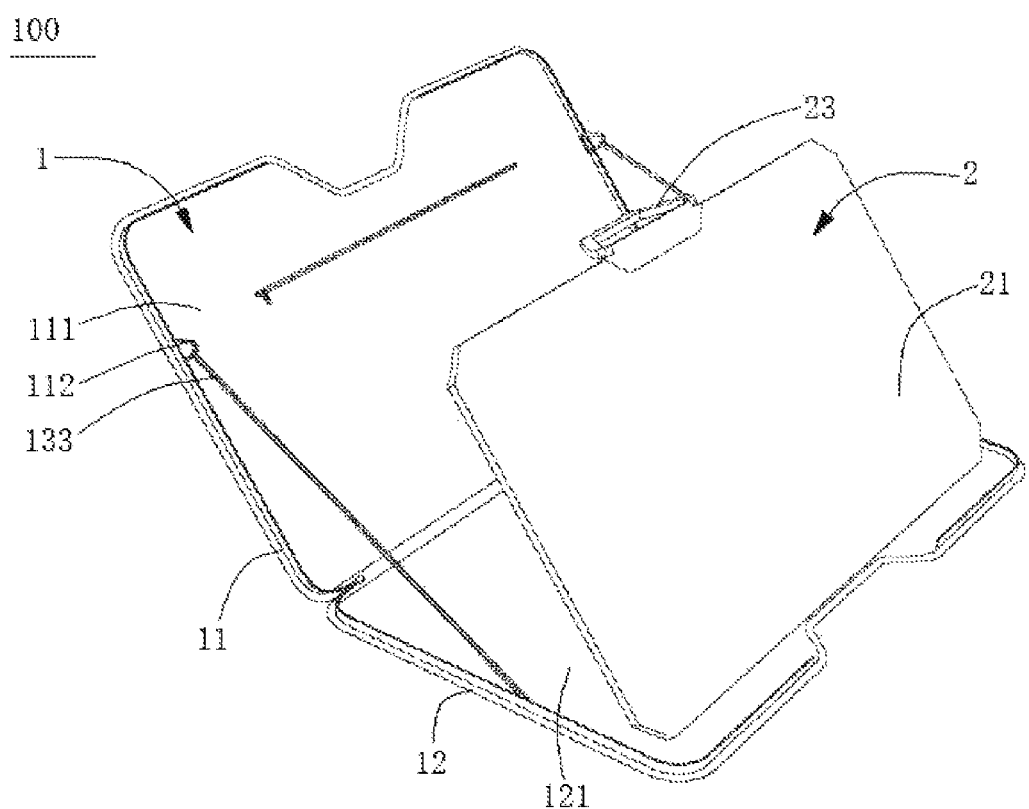
FIG. 2 is a structural view of a combined solar device according to embodiment two of the present disclosure.

As shown in FIG. 2, this embodiment provides another combined solar device 100 and another storage bag 1, and the storage bag 1 provided by this embodiment differs from the storage bag 1 provided by embodiment one in that two hooks 112 are disposed on a first bag body 11, the two hooks 112 are disposed on the left side of the first bag body 11 and the right side of the first bag body 11 respectively, two position maintaining assemblies are correspondingly provided, two first ends 131 are connected to the two hooks 112 in a one-to-one manner, and two second ends 132 are connected to two sides of a second bag body 12 in a one-to-one manner.

Embodiment Three

Figure 3:
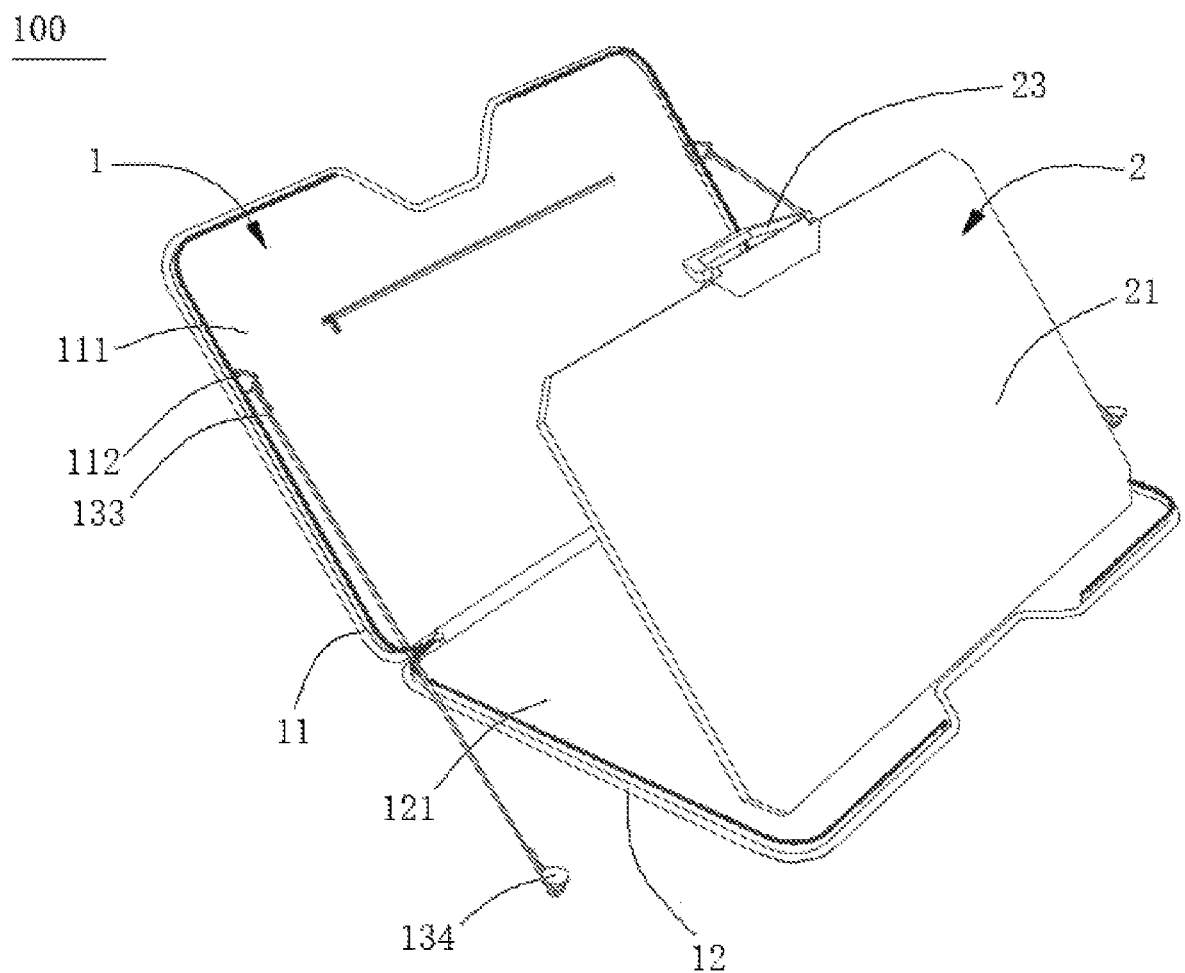
FIG. 3 is a structural view of a combined solar device according to embodiment three of the present disclosure.

As shown in FIG. 3, this embodiment provides another combined solar device 100 and another storage bag 1, and the storage bag 1 provided by this embodiment differs from the storage bag 1 provided by embodiment two in that the position maintaining assemblies also include two fastening nails 134 that are secured to the ground on two sides of the second bag body 12 in a one-to-one manner, and second ends 132 of the two position maintaining assemblies are connected to the two fastening nails 134 in a one-to-one manner.

Embodiment Four

Figure 4:
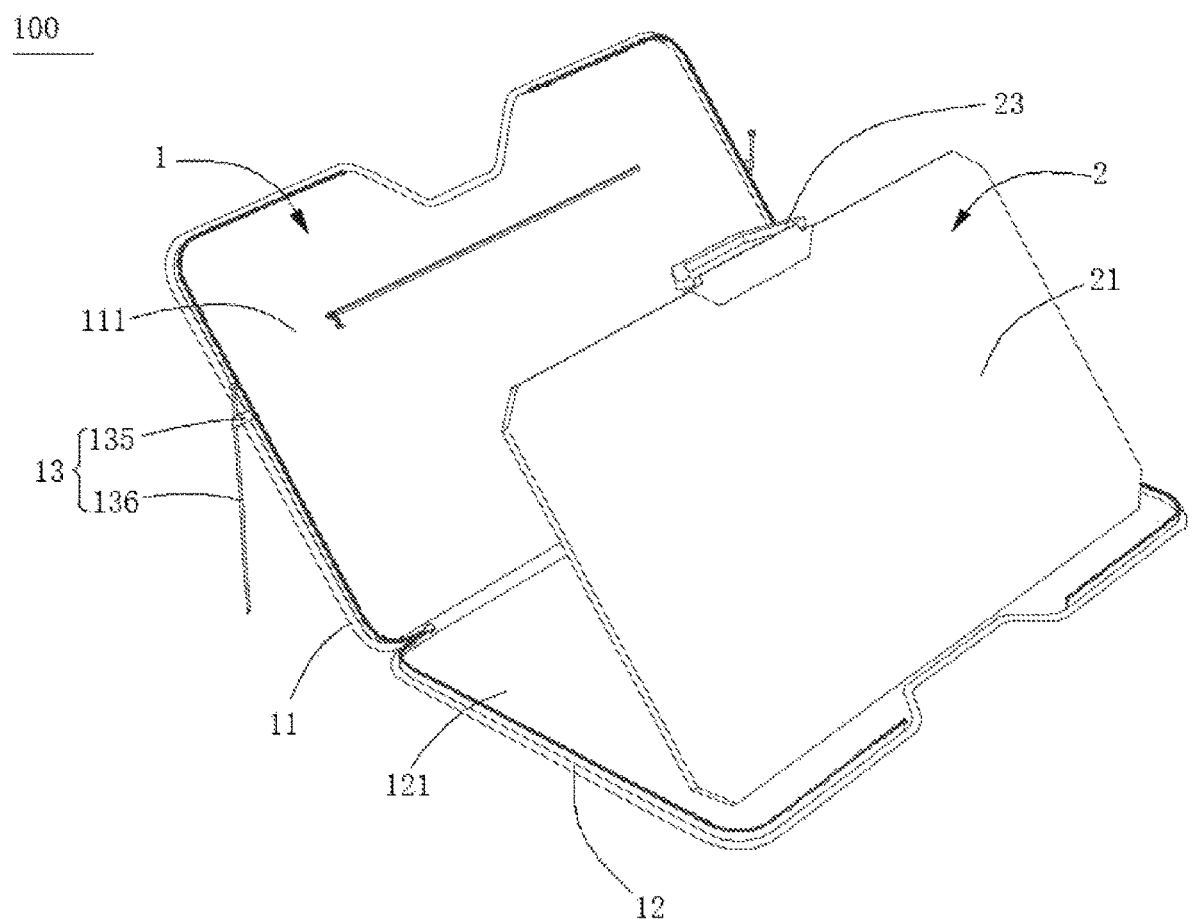
FIG. 4 is a structural view of a combined solar device according to embodiment four of the present disclosure.

As shown in FIG. 4, this embodiment provides another combined solar device 100 and another storage bag 1, and the storage bag 1 provided by this embodiment differs from the storage bag 1 provided by embodiment two in that each of position maintaining assemblies includes a fixing lug 135 and a support rod 136, two fixing lugs 135 are disposed on the left and right sides of a first bag body 11, the upper end of the support rod 136 is inserted into the fixing lug 135, and the lower end of the support rod 136 is pressed against the ground, thereby defining the included angle between the first bag body 11 and the ground.

In an embodiment, the fixing lug 135 is rotatably connected to the first bag body 11 about a horizontal axis, and the support rod 136 is configured to be a telescopic rod structure, or the position where the support rod 136 is connected to the fixing lug 135 is adjustable, thereby facilitating the adjustment of the included angle between the first bag body 11 and the ground.

Embodiment Five

Figure 5:
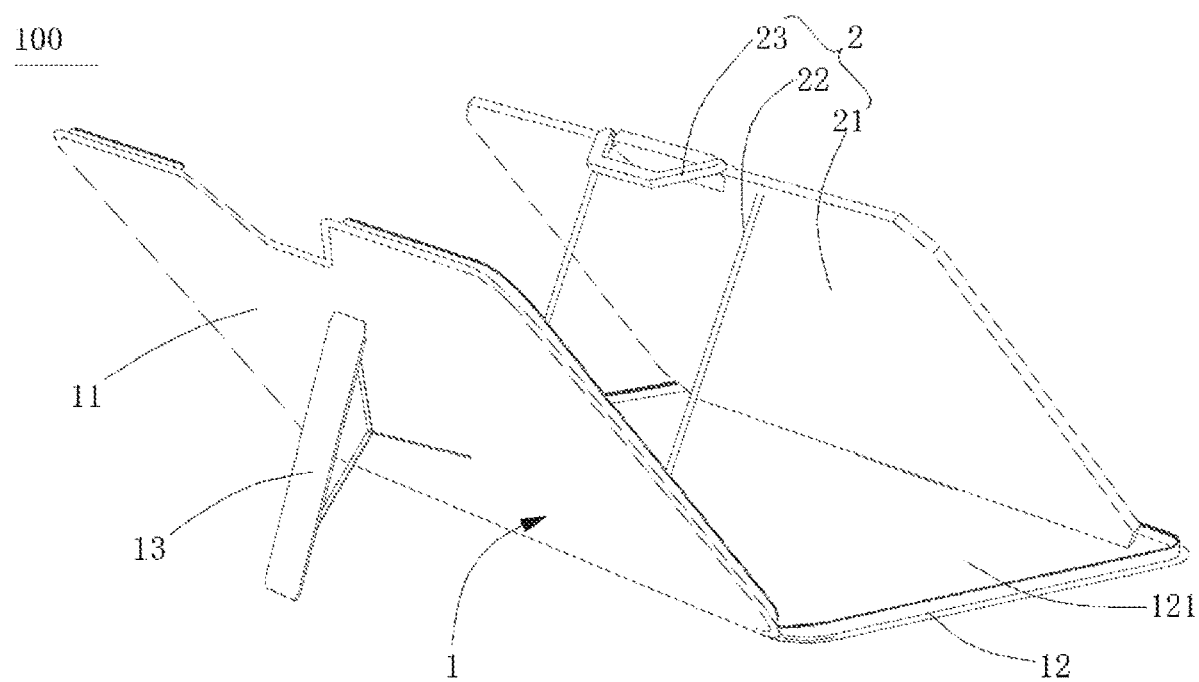
FIG. 5 is a structural view of a combined solar device according to embodiment five of the present disclosure.

As shown in FIG. 5, this embodiment provides another combined solar device 100 and another storage bag 1, and the storage bag 1 provided by this embodiment differs from the storage bag 1 provided by embodiment one in that a position maintaining assembly includes a support member disposed on a surface of a first bag body 11 facing away from a second bag body 12, one end of the support member is connected to the first bag body 11, and the other end of the support member is pressed against the ground, thereby defining the included angle between the first bag body 11 and the ground.

In an embodiment, the support member is rotatably connected to the first bag body 11 about a horizontal axis, and the included angle between the support member and the first bag body 11 may be fixed to multiple degrees such as 30 degrees, 45 degrees, 60 degrees, and 90 degrees, so as to facilitate the adjustment of the included angle between the first bag body 11 and the ground.

It is to be noted that the preceding are only example embodiments of the present disclosure and technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure is described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A storage bag, the storage bag being used for storing a bifacial solar panel and comprising:
    a first bag body, wherein a first reflective layer is disposed on an inner side of the first bag body; and
    a second bag body connected to the first bag body, wherein a second reflective layer is disposed on an inner side of the second bag body, wherein:
    the first bag body is movably connected to the second bag body, the second bag body is laid flat, and the storage bag further comprises a position maintaining assembly for maintaining an included angle between the first bag body and the second bag body;
    the position maintaining assembly comprises a first end and a second end that are opposite to each other, wherein the first end is connected to the first bag body, and the second end is connected to the bifacial solar panel;
    a distance between the second end and the first end is adjustable; and
    the position maintaining assembly is configured to be a flexible structure and further comprises a body, wherein the first end and the second end are disposed at two opposite ends of the body, the second end is connectable to the body so that the second end and the body form an annular structure, the annular structure is configured to be sleeved on the bifacial solar panel, and a position where the second end is connected to the body is adjustable.

2. The storage bag according to claim 1, wherein the position maintaining assembly further comprises a limiting strap, wherein two ends of the limiting strap are configured to be the first end and the second end respectively, wherein
the first end is rotatably connected to the first bag body; and
the second end is connected to one of the second bag body or the bifacial solar panel; or the position maintaining assembly further comprises a fastening nail, wherein the fastening nail is secured to the ground, and the second end is connected to the fastening nail.

3. A combined solar device, comprising a bifacial solar panel and a storage bag, wherein
the bifacial solar panel comprises a panel assembly and a support, an upper end of the support is connected to an upper side of the panel assembly; and
the storage bag is used for storing the bifacial solar panel and comprises:
a first bag body, wherein a first reflective layer is disposed on an inner side of the first bag body; and
a second bag body connected to the first bag body, wherein a second reflective layer is disposed on an inner side of the second bag body, and a lower end of the support abuts against the second bag body, wherein:
the first bag body is movably connected to the second bag body, the second bag body is laid flat, and the storage bag further comprises a position maintaining assembly for maintaining an included angle between the first bag body and the second bag body;
the position maintaining assembly comprises a first end and a second end that are opposite to each other, wherein the first end is connected to the first bag body, and the second end is connected to one of the second bag body, the bifacial solar panel, or the ground;
a distance between the second end and the first end is adjustable; and
the position maintaining assembly is configured to be a flexible structure and further comprises a body, wherein the first end and the second end are disposed at two opposite ends of the body, the second end is connectable to the body so that the second end and the body form an annular structure, the annular structure is configured to be sleeved on the bifacial solar panel, and a position where the second end is connected to the body is adjustable.

4. The combined solar device according to claim 3, wherein the position maintaining assembly further comprises a limiting strap, wherein two ends of the limiting strap are configured to be the first end and the second end respectively, wherein
the first end is rotatably connected to the first bag body; and
the second end is connected to one of the second bag body or the bifacial solar panel; or the position maintaining assembly further comprises a fastening nail, wherein the fastening nail is secured to the ground, and the second end is connected to the fastening nail.

\* \* \* \* \*